United States Patent [19]

Takata et al.

[11] 4,219,310
[45] Aug. 26, 1980

[54] CONSTRUCTION OF ADJUSTABLE BLADE SHAFT BEARING IN AXIAL-FLOW FAN WITH ADJUSTABLE BLADES

[75] Inventors: Akira Takata, Aza & Togakushi, Amimachi; Kazuhiko Ozaki, Minorimachi, both of Japan

[73] Assignee: Hitachi, Ltd., Japan

[21] Appl. No.: 4,223

[22] Filed: Jan. 17, 1979

[30] Foreign Application Priority Data

Jan. 18, 1978 [JP] Japan .................................. 53-3280

[51] Int. Cl.² .......................................... F04D 29/36
[52] U.S. Cl. ................................ 416/146 A; 416/174; 416/205
[58] Field of Search ............... 416/146 R, 146 A, 174, 416/168 RA, 205

[56] References Cited

U.S. PATENT DOCUMENTS

| | | | |
|---|---|---|---|
| 2,248,590 | 7/1941 | Smith | 416/205 |
| 2,250,668 | 7/1941 | Hill | 308/231 |
| 2,499,837 | 3/1950 | Sheets et al. | 416/205 |
| 2,997,111 | 8/1961 | Biermann | 416/205 |
| 3,088,524 | 5/1963 | Barden | 416/174 |
| 3,819,296 | 6/1974 | Sugano et al. | 416/168 X |
| 3,920,353 | 11/1975 | Bredsted | 416/168 A |
| 3,937,300 | 2/1976 | Avery | 184/70 |
| 4,046,486 | 9/1977 | Kolb | 416/146 A |

FOREIGN PATENT DOCUMENTS

| | | | |
|---|---|---|---|
| 558107 | 6/1957 | Belgium | 416/205 |
| 1004657 | 4/1952 | France | 416/174 |
| 1008184 | 5/1952 | France | 416/174 |
| 1011419 | 12/1965 | United Kingdom | 416/157 |
| 1512559 | 6/1978 | United Kingdom | 416/146 A |

Primary Examiner—Everette A. Powell, Jr.
Attorney, Agent, or Firm—Craig & Antonelli

[57] ABSTRACT

According to the present invention, in an adjustable blade shaft bearing in an axial-flow fan with adjustable blades, the adjustable blade shaft bearing or a thrust bearing is packed with an annular cover having a U-shaped cross-sectional configuration and a lubricating oil is sealed in the annular cover.

With the above construction, under the centrifugal force produced by the rotation of the axial-flow fan, the lubricating oil can be forced to act always on the rolling surface. Moreover the devices and machining of parts required in the conventional forced lubrication systems may be eliminated so that the construction may be simplified.

5 Claims, 5 Drawing Figures

CONSTRUCTION OF ADJUSTABLE BLADE SHAFT BEARING IN AXIAL-FLOW FAN WITH ADJUSTABLE BLADES

BACKGROUND OF THE INVENTION

1. Field of the Invention

The present invention relates to a construction of a thrust bearing for an adjustable blade shaft of an axial-flow fan with adjustable blades which swings at a relatively slow speed.

2. Brief Description of the Prior Art

The adjustable blade shaft bearing which supports a plurality of adjustable blades attached to an impeller hub around its outer periphery must support a heavy load of accessaries such as clamping nuts, arms and so on while lightly, smoothly acting when the adjustable blades are swung.

In order to satisfy the requirements described above, spherical thrust roller bearings are used. In order to prevent fretting corrosion due to small vibrations during the operation, the forced lubrication systems have been used. A typical example of the forced lubrication systems is disclosed in FIG. 2, at page 40 of Hitachi Hyoron Vol. 60, No. 5, published May 1978.

Oil supply and discharge holes are formed through a main shaft which supports an impeller hub, and one end of the oil supply hole the other end of which is connected to an oil supply device is connected to one end of a supply hole the other end of which opens to a spherical thrust roller bearing and which is formed through the impeller hub. The other end of the discharge hole is connected to the other end of another hole which is formed through the adjustable blade shaft and one end of which opens to the thrust bearing.

In the prior art system of the type described above, therefore, not only the machining of devices and parts required for forced lubrication is required, but also there arises the problem that the workability is extremely worse because of the spill of lubricating oil in the case of the disassembly of the adjustable blades.

Meanwhile, the thrust bearing is covered with a cover in order to protect the bearing surfaces from water, dust or the like, and if needs demand, lubricating oil such as grease is filled in the cover. This arrangement is well-known in the art from U.S. Pat. No. 2,230,668. Furthermore U.S. Pat. No. 3,937,300 teaches the provision of a lubricating oil cartridge at the end of a spline shaft, the cartridge being replaced with a new one when lubricating oil decreases.

SUMMARY OF THE INVENTION

Accordingly, a first object of the present invention is to provide a construction of an adjustable blade shaft bearing for use in an axial-flow fan with adjustable blades which can eliminate the devices and machining steps required for the forced lubrication systems and which may simplify the construction and improve the workability.

Another object of the present invention is to provide a construction of an adjustable blade shaft bearing for use in an axial-flow fan with adjustable blades wherein a bearing which is available in the commercial market may be used without any machining of the thrust bearing per se.

In order to attain the above objects, the present invention arranges a thrust bearing for an axial-flow fan with adjustable blades in the following manner.

An annular cover is prepared which has a U-shaped cross-sectional configuration, a bottom wall which rides on an outer ring or race of a thrust bearing and side walls in opposed relationship with inner and outer radial surfaces of inner and outer rings or races so as to cover them. Next, liquid sealing means are disposed between the inner peripheral surfaces adjacent to the open end of the annular cover and the inner and outer radial surfaces of the inner ring or race. Therefore, the annular cover packs the thrust bearing. And a lubricating oil with a low viscosity is filled into the annular cover.

Since the present invention provides the above described arrangement, the centrifugal force effectively acts during the rotation of the axial-flow fan so that the lubricating oil may always act on the rolling surfaces. Furthermore, the devices and machining of parts required in the prior art forced lubrication systems may be eliminated so that the construction may be simplified. At the same time, the present invention may have the effect that the workability may be improved. Since no special machining on the bearing per se is required, bearings available in the market may be readily used.

BRIEF DESCRIPTION OF THE DRAWINGS

Further objects of the present invention will become apparent from the following description and the accompanying drawings.

Figure 1:
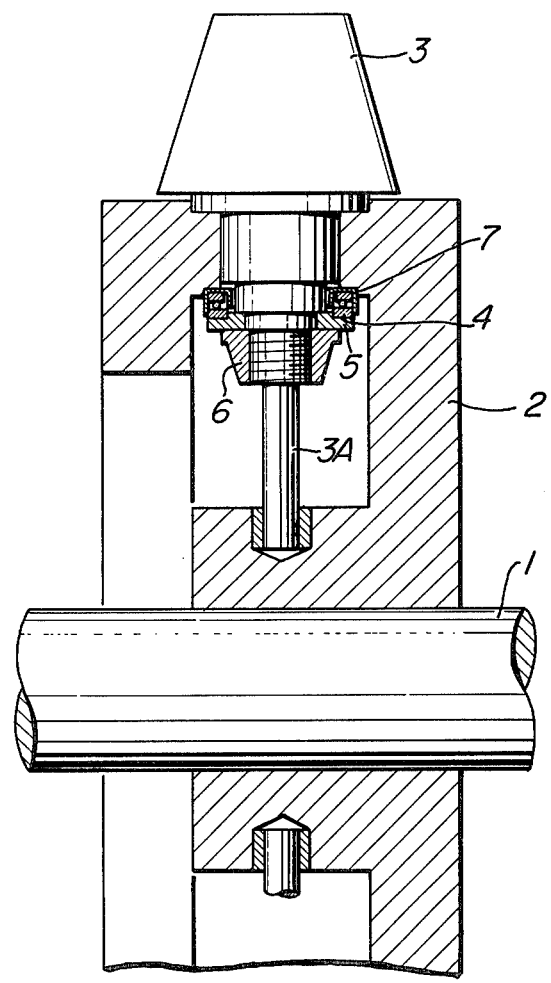
FIG. 1 shows one embodiment of the present invention and is a sectional view of an adjustable blade shaft bearing of an axial-flow fan with adjustable blades.

DESCRIPTION OF THE PREFERRED EMBODIMENTS 1 is a shaft of an axial-flow fan with adjustable blades; 2, an impeller hub fitted on the shaft 1; 3, a plurality of adjustable blades equiangularly disposed around the periphery of the impeller hub 2; 3a, a shaft of each adjustable blade 3; and 4, a thrust bearing for supporting the adjustable blade 3 which is mounted on the shaft 3A and securely held in position by means of a nut 6 screwed on the shaft 3A so as to press against the thrust bearing 4 through a sleeve 5.

Figure 2:
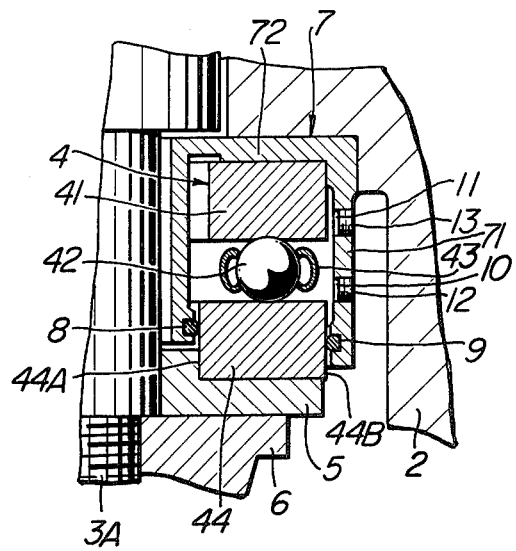
FIG. 2 is a detailed sectional view, on an enlarged scale, of the thrust bearing shown in FIG. 1.

As best shown in FIG. 2, the thrust bearing 4 is enclosed with an annular cover 7 and is packed so that a low viscosity lubricating oil may fill the interior of the thrust bearing 4.

The cover 7 has a U-shaped or a cup-shaped cross sectional configuration. Packings 8 and 9 are attached to the inner peripheral surfaces adjacent to the opening end of the annular cover 7. Thereafter, the thrust bearing 4 is assembled with an outer ring or race 41, a retainer 43 which holds rolling members 42 and an inner ring or race 44 in the order named. The inner and outer radial surfaces 44A and 44B of the inner ring 44 are sealed with the packings 8 and 9.

Figure 3:
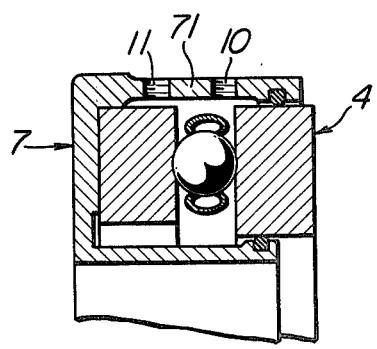
FIG. 3 is a view used for the explanation of the method for filling a lubricating oil into the thrust bearing shown in FIG. 2.

10 is an oil inlet port formed through a side wall 71 of the annular cover 7 which covers the outer radial surfaces of the inner and outer rings or races 44 and 41; and 11, an air vent. As best shown in FIG. 3, after the thrust bearing 4 has been incorporated into the annular cover 7, the side wall 71 of the annular cover 7 is directed upwards and a lubricating oil is supplied through the oil inlet port 10 while the air is drawn through the air vent 11, whereby the lubricating oil may fill the interior of the annular cover 7. When the lubricating oil overflows through the air vent 11, sealing is effected with plugs 12 and 13, respectively. It is preferable to use not a lubricating oil with a high viscosity but a lubricating oil with a low viscosity, especially a turbine oil with an additive No. 90.

The annular cover 7 into which is incorporated the thrust bearing 4 in the manner described above is mounted in such a way that the bottom wall 72 is directed radially outwardly of the impeller hub 2 while the open end is directed radially inwardly. Thereafter, as with the prior art, the adjustable blades 3 are inserted into the boss portion of the impeller hub 2, and the annular cover 7 including the thrust bearing 4 is incorporated in the impeller hub 2 with the nut 6 through the sleeve 5. That is, the thrust bearing 4 which is covered with the annular cover 7 is fitted over the impeller hub 2 with the bottom wall 72 and part of the side wall 71 of the annular cover 7 brought into contact with the impeller hub 2, and is rigidly secured to the adjustable blade shaft 3A through the sleeve 5 on the side of the inner ring or race 44 which is not directed to the rolling member.

Next the mode of operation of the adjustable blade bearing in the axial-flow fan with adjustable blades which bearing has the construction described hereinabove will be described. During the operation of the axial-flow fan, the lubricating oil within the annular cover 7 is subjected to the centrifugal force so that the increase in oil pressure results, but because of the interruption by the bottom wall 72 of the annular cover 7, the leakage of the oil to the exterior will not occur. Furthermore, as the temperature rises as the operation continues, the expansion of the lubricating oil which is sealed results. When the operation is stopped so that the temperature drops, the contraction of the oil occurs. During the operation, the lubricating oil is forced on the side of the bottom surface 72 of the annular cover 7 so that a very small quantity of air in the annular cover 7 leaks around the packings 8 and 9 located at the opening of the annular cover 7. When the operation is stopped, the interior of the annular cover 7 becomes a negative pressure more or less so that it is considered that a little quantity of air is sucked around the packings 8 and 9. However, only a small quantity of air flows in and out, but there is almost no leakage of lubricating oil. As a result, there is no fear of the leakage of lubricating oil. Furthermore, the devices and machining steps which are required in the conventional forced lubrication systems may be eliminated so that the construction of the axial-flow fan with adjustable blades may be simplified. That is, a lubricating oil supply device and the machining steps for forming lubricating oil supply and discharge holes in the shaft 1, the impeller hub 2 and the adjustable blades 3A and for forming packing grooves in the top of the thrust bearing; that is, the inside peripheral surface of the impeller hub 2 which is in surface opposed relationship with the outer periphery of the adjustable blade shaft 3A and in the inside peripheral surface of the impeller hub 2 which is in surface opposed relationship with the outer peripheral surface of the nut 6 may be eliminated.

Figure 4:
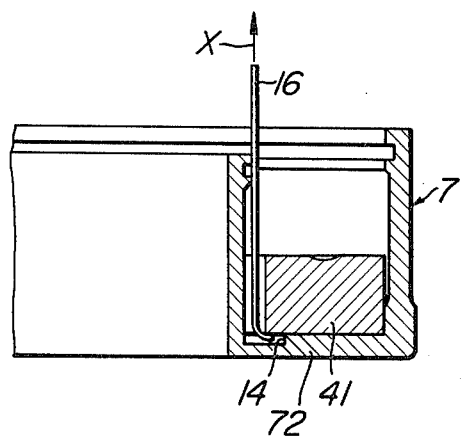
FIG. 4 is a view used for the explanation of the disassembly of the bearing shown in FIG. 2.

When the thrust bearing 4 is removed from the annular cover 7, the inner ring or race 44, the retainer 43 which holds the rolling members 42 and the outer ring or race 41 are disassembled in the order named. As to the outer ring or race 41, as best shown in FIG. 4 a step 14 is previously formed on the inner surface of the bottom wall 72 of the annular cover 7 so that when assembled, a space or gap is formed between the bottom wall 72 and the side of the outer ring or race 41 which is not directed to the rolling member.

When constructed in the manner described above, as shown in FIG. 4, the outer ring 41 may be easily removed out of the annular cover 7 by inserting a latch 16 into the space described above and lifting it in the direction indicated by the arrow X.

Figure 5:
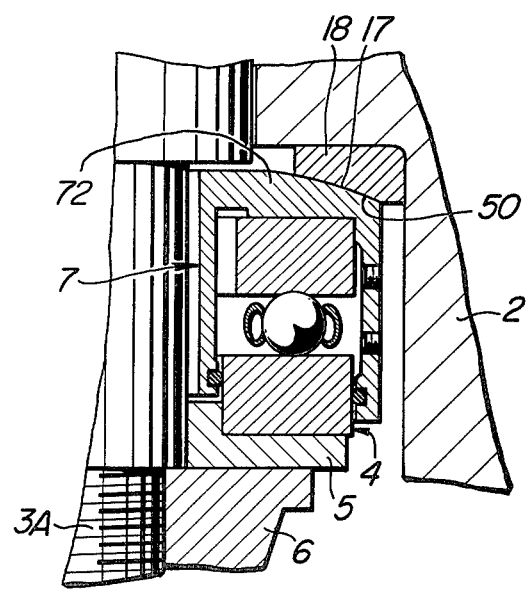
FIG. 5 is a detailed sectional view, on an enlarged scale of another embodiment of a thrust bearing in accordance with the present invention.

FIG. 5 shows another embodiment of the present invention. A base metal 18 is inserted between the bottom wall 72 of the annular cover 7 and the bearing mounting portion of the impeller hub 2, and the spherical surface 17 formed on the exterior surface of the bottom wall 72 is made into engagement with the spherical surface 50 formed on the base metal 18. The other arrangements are similar to those of the first embodiment described above.

When constructed as described above, the automatic alignment of the adjustable blades 3 to the impeller hub 2 may be effected so that distortions and deformations and the like of the impeller hub 2 due to machining the bearing mounting surface thereon may be considerably tolerated.

What is claimed is:

1. A construction of an adjustable blade shaft bearing in an axial-flow fan with adjustable blades of the type wherein an outer ring is mounted on an impeller hub while an inner ring is mounted in such a way as to rotate in unison with an adjustable blade shaft wherein an annular cover which has a U-shaped cross-sectional configuration, a bottom wall which rides over the outer surface of said outer ring and side walls which are in opposed relationship with the inner radial surfaces and outer radial surfaces of said rings so as to cover them is provided; liquid sealing means are disposed between the inner peripheral surfaces adjacent to the open end of said annular cover and the inner and outer radial surfaces of said inner ring; and a lubricating oil with a low viscosity is filled in said annular cover.

2. A construction of an adjustable blade shaft bearing in an axial-flow fan with adjustable blades as set forth in claim 1 further characterized in that an oil inlet port for a lubricating oil and an air vent are formed through either one of said side walls of said annular cover.

3. A construction of an adjustable blade shaft bearing in an axial-flow fan with adjustable blades as set forth in claim 1 further characterized in that a step is formed on the inner surface of said bottom wall of said annular cover and a space is left between said inner surface of said bottom wall and the surface of said outer ring which faces to said inner surface.

4. A construction of an adjustable blade shaft bearing in an axial-flow fan with adjustable blades as set forth in claim 1 further characterized in that a spherical surface is formed on the exterior surface of said bottom wall of said annular cover, and a spherical surface base metal is disposed between said spherical surface and the bearing mounting portion of said impeller hub.

5. A construction of an adjustable blade shaft bearing in an axial-flow fan with adjustable blades as set forth in claim 1 further characterized in that a turbine oil with an additive No. 90 is used as said lubricating oil with a low viscosity.

* * * * *